(12) United States Patent
Campbell et al.

(10) Patent No.: US 11,169,576 B2
(45) Date of Patent: Nov. 9, 2021

(54) FOLDING ACCESSORY DEVICE SUPPORT

(71) Applicant: Microsoft Technology Licensing, LLC, Redmond, WA (US)

(72) Inventors: Kent Allen Campbell, Issaquah, WA (US); Timothy Michael Sullivan, Woodinville, WA (US); Paul Ryan Sandoval, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/866,270

(22) Filed: May 4, 2020

(65) Prior Publication Data

US 2021/0173434 A1 Jun. 10, 2021

Related U.S. Application Data

(60) Provisional application No. 62/945,606, filed on Dec. 9, 2019.

(51) Int. Cl.
*G06F 1/16* (2006.01)

(52) U.S. Cl.
CPC ............ *G06F 1/166* (2013.01); *G06F 1/1607* (2013.01); *G06F 1/1616* (2013.01); *G06F 1/1637* (2013.01)

(58) Field of Classification Search
CPC combination set(s) only.
See application file for complete search history.

(56) References Cited

U.S. PATENT DOCUMENTS

| 5,732,928 | A  |   | 3/1998  | Chang et al. |            |
|-----------|----|---|---------|--------------|------------|
| 6,016,248 | A  | * | 1/2000  | Anzai        | G06F 1/1626 |
|           |    |   |         |              | 361/679.59 |
| 6,768,635 | B2 | * | 7/2004  | Lai          | G06F 1/1616 |
|           |    |   |         |              | 248/351    |
| 7,545,634 | B2 | * | 6/2009  | Simonian     | A45C 3/02  |
|           |    |   |         |              | 361/679.55 |
| 8,004,834 | B2 | * | 8/2011  | Shih         | G06F 1/1632 |
|           |    |   |         |              | 361/679.55 |
| 8,050,032 | B2 | * | 11/2011 | Trang        | G06F 1/1632 |
|           |    |   |         |              | 361/679.59 |
| 8,089,760 | B2 | * | 1/2012  | Yi-Chang     | G06F 1/1681 |
|           |    |   |         |              | 361/679.59 |
| 8,139,357 | B2 | * | 3/2012  | Trang        | G06F 1/203 |
|           |    |   |         |              | 361/679.59 |
| 8,605,433 | B2 | * | 12/2013 | Chiang       | F16M 13/005 |
|           |    |   |         |              | 361/679.59 |

(Continued)

FOREIGN PATENT DOCUMENTS

| CN | 2896367 Y     | 5/2007 |
|----|---------------|--------|
| KR | 20150021740 A | 3/2015 |

OTHER PUBLICATIONS

"International Search Report and Written Opinion Issued in PCT Application No. PCT/US20/059250", dated Feb. 9, 2021, 13 Pages.

*Primary Examiner* — Lisa Lea-Edmonds
(74) *Attorney, Agent, or Firm* — Ray Quinney & Nebeker P.C.; Paul N. Taylor

(57) ABSTRACT

In some embodiments, a support device includes an angled segment and a support segment. The angled segment is configured to be affixed to a bottom surface of a second device and rotatable relative to the bottom surface at an anchor axis. The support segment is connected to the angled segment along a support axis and rotatable relative to the angled segment around the support axis.

20 Claims, 4 Drawing Sheets

(56) References Cited

U.S. PATENT DOCUMENTS

| | | | |
|---|---|---|---|
| 8,714,351 B2* | 5/2014 | Toulotte | F16M 11/10 |
| | | | 206/320 |
| 8,820,695 B2* | 9/2014 | Nakada | A45C 13/1069 |
| | | | 248/454 |
| 8,997,983 B2 | 4/2015 | Sajid | |
| 9,235,230 B1 | 1/2016 | Tarnow et al. | |
| 9,266,641 B2* | 2/2016 | Quehl | A45C 11/00 |
| 9,335,793 B2* | 5/2016 | Rothkopf | G06F 1/1643 |
| 9,618,976 B2* | 4/2017 | Truong | H04N 5/655 |
| 9,740,238 B2* | 8/2017 | Han | G06F 1/1683 |
| 9,762,279 B2 | 9/2017 | Lee et al. | |
| 9,795,213 B1* | 10/2017 | Vier | F16M 11/2021 |
| 10,635,132 B1* | 4/2020 | Brocklesby | G06F 1/1683 |
| 2011/0050574 A1 | 3/2011 | Depay et al. | |
| 2011/0134588 A1* | 6/2011 | Barnett | F16M 11/10 |
| | | | 361/679.01 |
| 2013/0241381 A1 | 9/2013 | Hynecek et al. | |
| 2015/0092346 A1 | 4/2015 | Ben et al. | |
| 2015/0138697 A1* | 5/2015 | Murauyou | G06F 1/1626 |
| | | | 361/679.01 |
| 2015/0293564 A1* | 10/2015 | Gu | G06F 1/1626 |
| | | | 361/679.55 |
| 2018/0191394 A1 | 7/2018 | Kao et al. | |
| 2018/0235093 A1* | 8/2018 | Meyers | F16M 11/38 |
| 2020/0348731 A1* | 11/2020 | Jung | G06F 1/166 |

\* cited by examiner

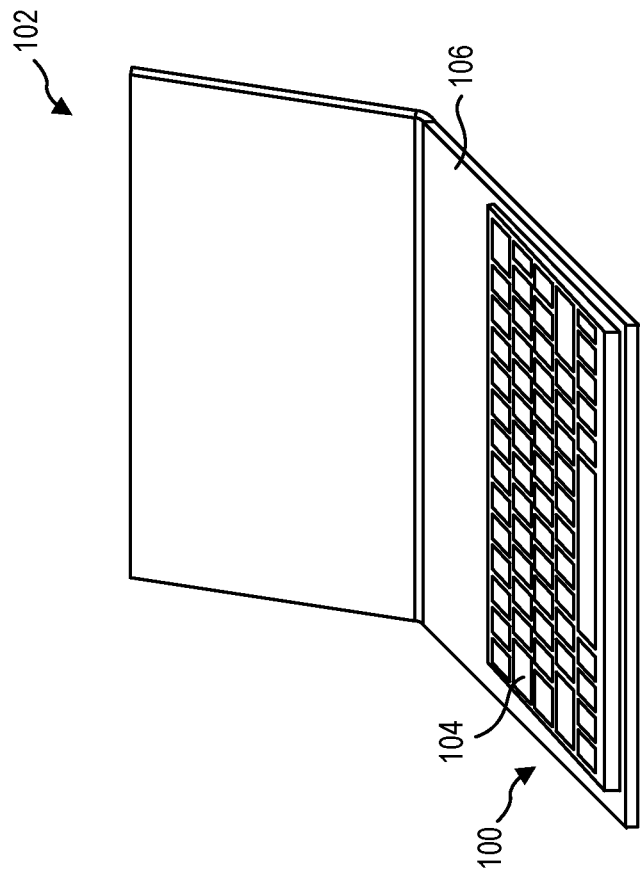

FOLDING ACCESSORY DEVICE SUPPORT

CROSS-REFERENCE TO RELATED APPLICATIONS

This application claims priority to and the benefit of U.S. Provisional Patent Application No. 62/945,606 filed on Dec. 9, 2019. The aforementioned application is expressly incorporated herein by reference in its entirety.

BACKGROUND

Background and Relevant Art

Electronic devices commonly utilize wireless accessory devices to allow users to provide inputs to or interact with the electronic devices. In some cases, the accessory devices are stowable in or carried by the electronic device. To make the accessory device stowable in or carried by the electronic device, the ergonomics of the accessory device can be compromised.

BRIEF SUMMARY

In some embodiments, an accessory device for providing inputs to an electronic device includes a deployable stand to improve the ergonomics of the accessory device. In some embodiments, a foldable support has a flat configuration and a stand configuration where the flat configuration lays parallel to a bottom surface of the accessory device and the stand configuration tilts the accessory device to improve ergonomics and resists sliding of the accessory device on a surface.

In some embodiments, a support device includes an angled segment and a support segment. The angled segment is configured to be affixed to a bottom surface of a second device and rotatable relative to the bottom surface at an anchor axis. The support segment is connected to the angled segment along a support axis and rotatable relative to the angled segment around the support axis.

In some embodiments, an input device for an electronic device includes a body with an input mechanism on a first side of the body and a foldable support positioned on a second side of the body opposite the first side. The foldable support is affixed to the second side of the body and an anchor axis of the foldable support is offset from an edge of the body. The foldable support has a first surface and an opposite second surface.

In some embodiments, an input device for an electronic device includes a body with an input mechanism on a first side of the body and a foldable support positioned on a second side of the body opposite the first side. The foldable support is affixed to the second side of the body and has a flat configuration and a stand configuration. The flat configuration is parallel to the bottom surface of the body, and the stand configuration projects away from the bottom surface of the body when rotated away from an anchor axis that is offset from an edge of the body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1 is a perspective view of an accessory device in a docked position with an electronic device, according to at least one embodiment of the present disclosure;

FIG. 2-1 is a side view of an accessory device with a foldable support in a flat configuration, according to at least one embodiment of the present disclosure;

FIG. 2-2 is a side view of the accessory device of FIG. 2-1 in a stand configuration, according to at least one embodiment of the present disclosure;

FIG. 5-1 is a side view of an accessory device with a two-segment foldable support in a flat configuration, according to at least one embodiment of the present disclosure;

FIG. 5-2 is a side view of the accessory device of FIG. 5-1 in a stand configuration, according to at least one embodiment of the present disclosure.

DETAILED DESCRIPTION

The present disclosure relates generally to devices, systems, and methods for supporting an accessory device or electronic device at an ergonomic orientation. In some embodiments, a foldable support positioned on a bottom surface of the accessory device has a flat configuration and a stand configuration. When in the flat configuration, the foldable support is flat against a bottom surface of the accessory device and adds little height to the accessory device. When in the stand configuration, the foldable support supports a body of the accessory device at an angle relative to the surface upon which the accessory device rests. The foldable support may provide a more comfortable and familiar ergonomic position for a user to provide inputs to the accessory device.

In some embodiments, a wireless keyboard is nested between an upper portion and a lower portion of a foldable electronic device, such as a laptop computer. In some embodiments, the accessory device has a foldable support positioned on a bottom surface opposite the keyboard or other input device. The foldable support is connected to the bottom surface of the accessory device at one end of the foldable support, and a second end of the foldable support is movable to fold the foldable support into a stand configuration and lift up a portion of the accessory device.

In some embodiments, the accessory device is in data communication with an electronic device, such as a laptop computer, a tablet computer, a hybrid computer, a smartphone, a smart television, other appliance, an automobile (such as with a navigation system or control system of the automobile), or another electronic device. In some embodiments, a foldable support provides a first coefficient of friction in a flat configuration and a second coefficient of friction in a stand configuration.

Figures 1, 2:
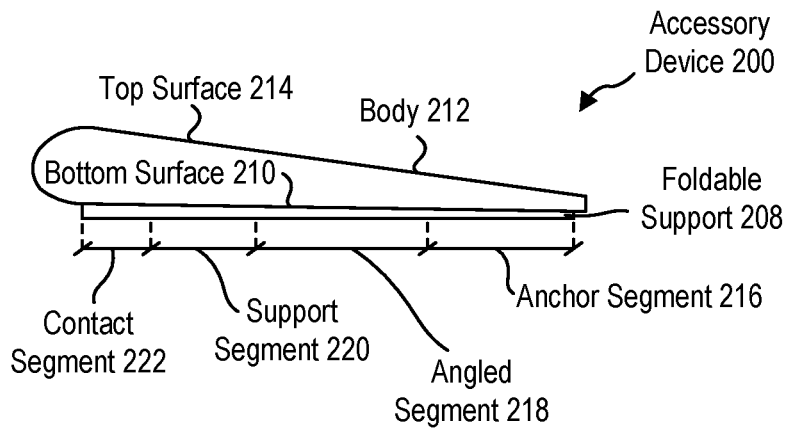
Figure 2:
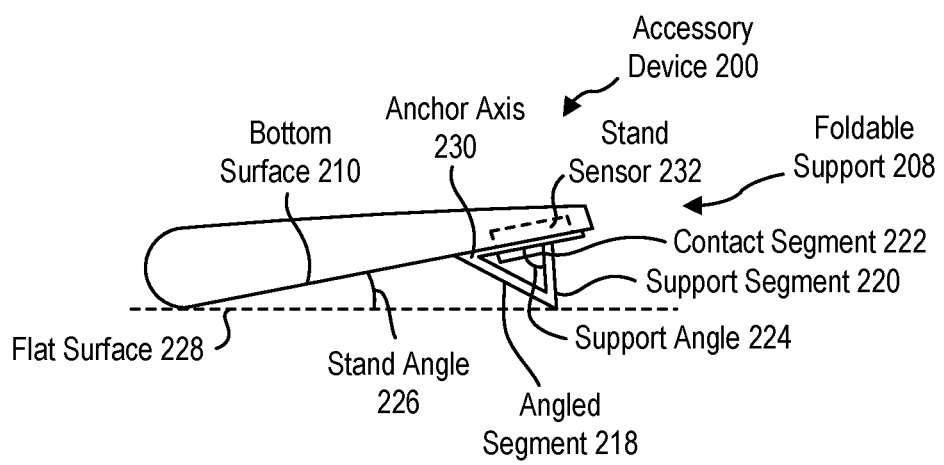

FIG. 1 shows a system that includes an accessory device 100 and an electronic device 102 in accordance with some embodiments. As shown in FIG. 1, a user places the accessory device 100 with an input device(s) 104 oriented upward (e.g., toward the user) on a first surface 106 of the electronic device 102 in a docked position. In some embodiments, the input device 104 is a conventional QWERTY keyboard or other alphanumeric keyboard, a number pad, a touch-sensitive surface (i.e., a capacitive or inductive touch-sensitive surface or display) such as trackpad, a scroll wheel, a trackball, a biometric reader, or other input device for providing information to the electronic device 102. The docked position may allow a user to easily transport and store the accessory device 100 in the electronic device. When open in a laptop posture, the electronic device 102 may support the accessory device 100 on the first surface 106.

In some embodiments, a user provides input commands to the accessory device 100 (and to the electronic device 102 via the accessory device 100) on the input device 104. In some embodiments, the accessory device 100 and the electronic device 102 utilize near field communication (NFC) protocol to charge and/or communicate via the coils in the accessory device 100 and the electronic device 102. In some embodiments, the accessory device 100 and the electronic device 102 utilize Qi protocol or other magnetic communication protocols to charge and/or communicate. In some embodiments, the accessory device 100 and the electronic device 102 communicate through other radio frequency communications, such as Bluetooth or WiFi-direct communication protocols.

In some embodiments, the accessory device 100 blocks, obscures, or otherwise inhibits the use of a portion of the electronic device 102 when the accessory device 100 is in the docked position. In some embodiments, the accessory device 100 is usable in an undocked position remote of the first surface 106 of the electronic device 102, as is shown in FIG. 2-1. The user can place the accessory device 100 in the undocked position to continue using the accessory device 100 wirelessly to the electronic device 102 without occupying the first surface 106.

In some embodiments, the accessory device has a fabric covering, e.g., is wrapped in fabric. In some embodiments, the fabric covering includes a foldable support component on the bottom of the accessory device.

Referring now to FIG. 2-1, in some embodiments, the foldable support 208 is affixed to a bottom surface 210 of a body 212 of the accessory device 200. The bottom surface 210 is opposite a top surface 214 that includes one or more input devices (e.g., input device 104 of FIG. 1). The foldable support 208 is fixed to the bottom surface 210 along an anchor segment 216 of the foldable support 208. In some embodiments, the anchor segment 216 is affixed to the bottom surface 210 on substantially all of the surface area of the anchor segment 216. In some embodiments, the anchor segment 216 is affixed to the bottom surface 210 on at least 90% of the surface area of the anchor segment 216. In some embodiments, the anchor segment 216 is affixed to the bottom surface 210 on at least 50% of the surface area of the anchor segment 216. In some embodiments, the foldable support 208 has at least two segments connected to the anchor segment 216 that are foldable along flexible connections or hinges and movable relative to the anchor segment 216. In a flat configuration, all of the segments of the foldable support 208 are positioned against the bottom surface 210 of the accessory device 200.

In some embodiments, the additional segments include at least an angled segment 218 and a support segment 220. In some embodiments, the foldable support 208 further includes a contact segment 222. The segments are movable relative to one another by flexible connections positioned between the segments. In some embodiments, the foldable support 208 includes hinges positioned between the segments. In some embodiments, the foldable support 208 includes flexible material connecting the segments to allow rotation of the segments relative to one another.

In some embodiments, the flexible connections provide little or no rotational resistance and allow the segments to rotate freely between the stand configuration and the flat configuration. In some embodiments, the flexible connections provide less than 100 Newton-millimeters (N-mm) of rotational resistance each. In some embodiments, the flexible connections provide less than 200 Newton-millimeters (N-mm) of rotational resistance each. In some embodiments, it is critical that the flexible connections provide less than 400 Newton-millimeters (N-mm) of rotational resistance each.

By folding the additional segments to wrap toward the anchor segment 216, the foldable support 208 is movable to a stand configuration as shown in FIG. 2-2. In some embodiments, the stand configuration includes the support segment 220 of the foldable support 208 oriented at a support angle 224 to the bottom surface 210 of the accessory device 200. In some embodiments, the foldable support 208 in the stand configuration orients the bottom surface 210 of the accessory device 200 at a stand angle 226 relative to a flat surface 228 upon which the accessory device 200 rests in a range having an upper value, a lower value, or upper and lower values including any of 2°, 4°, 6°, 8°, 10°, 12°, 14°, 15°, or any values therebetween. In some embodiments, the stand angle 226 is greater than 2°. In some embodiments, the stand angle 226 is less than 15°. In some embodiments, the stand angle 226 is between 2° and 15°.

In some embodiments, the stand configuration includes folding the foldable support 208 around at least an anchor axis 230, such that the angled segment 218 moves around the anchor axis 230. In some embodiments, the contact segment 222 is positioned parallel to and contacting the anchor segment 216 of the foldable support 208. The support segment 220 is oriented at a support angle 224 to the bottom surface 210 and/or the anchor segment 216 to provide support to the accessory device 200. In some embodiments, the support angle 224 is in a range having an upper value, a lower value, or upper and lower values including any of 60°, 65°, 70°, 75°, 80°, 85°, 90°, or any values therebetween. In some embodiments, the support angle 224 is greater than 60°. In some embodiments, the support angle 224 is less than 90°. In some embodiments, the support angle 224 is between 60° and 90°. In at least one embodiment, the support angle 224 is between 70° and 85°. As the support angle 224 approaches 90°, the support segment 220 provides more compressive strength and stability to the foldable support 208 in the stand configuration. As the support angle 224 decreases, the foldable support 208 in the stand configuration provides greater longitudinal stability.

In some embodiments, the accessory device 200 and/or the foldable support 208 includes a stand sensor 232 configured to detect when the foldable support 208 is in the stand configuration. In some embodiments, the stand sensor 232 is a Hall Effect sensor that measures the presence of a magnet located in the contact segment 222 and/or the support segment 220 in proximity to the stand sensor 232. When the foldable support 208 is in the stand configuration, a magnetic element positioned in or on the contact segment 222 or support segment 220 may be located proximate the stand sensor 232.

In some embodiments, the stand sensor 232 is a force sensor positioned to measure a force applied by the support segment 220. The force measured by the stand sensor 232 when the foldable support 208 is in the flat configuration will be less than when the foldable support 208 is in the stand configuration. The increase in measured force may indicate the foldable support 208 is in the stand configuration.

In some embodiments, the stand sensor 232 is a contact switch located in a recess of the anchor segment 216. When the foldable support 208 is in the stand configuration, a complementary protrusion in the contact segment 222 and/or the support segment 220 contacts the stand sensor 232 and indicates the foldable support 208 is in the stand configuration.

Figure 3:
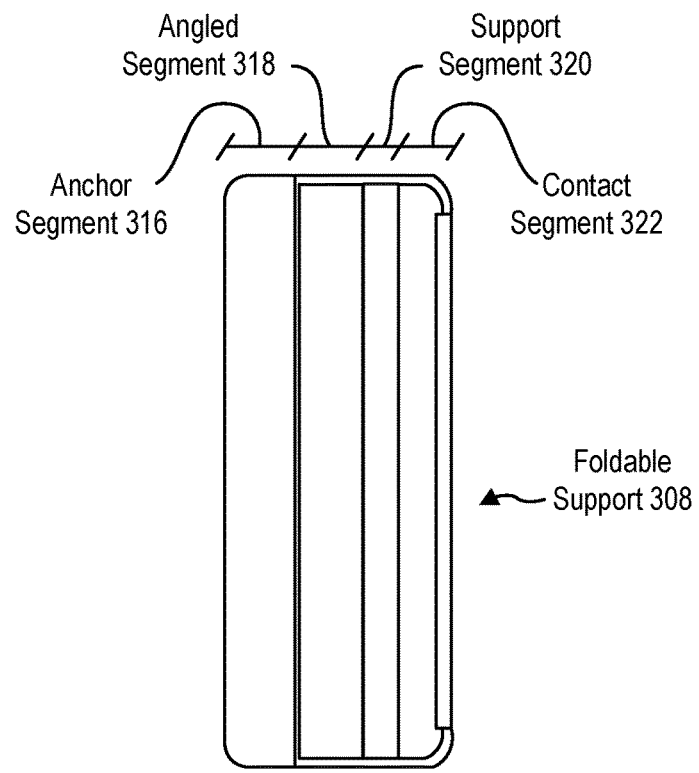
FIG. 3 is a top view of a foldable support, according to at least one embodiment of the present disclosure.

Referring now to FIG. 3, in some embodiments, a foldable support 308 has four segments. The anchor segment 316 is configured to be affixed to the bottom surface of an accessory device or other electronic device, while the remaining three segments are movable relative to the anchor segment 316. In some embodiments, the contact segment 322 is shorter than the angled segment 318. In some embodiments, the support segment 320 is shorter than the angled segment 318. In some embodiments, both the support segment 320 and the contact segment 322 are shorter than the angled segment 318. In some embodiments, the support segment 320 is shorter than both the angled segment 318 and the contact segment 322. In some embodiments, the support segment 320 is shorter than the contact segment 322, which is, in turn, shorter than the angled segment 318.

Figure 4:
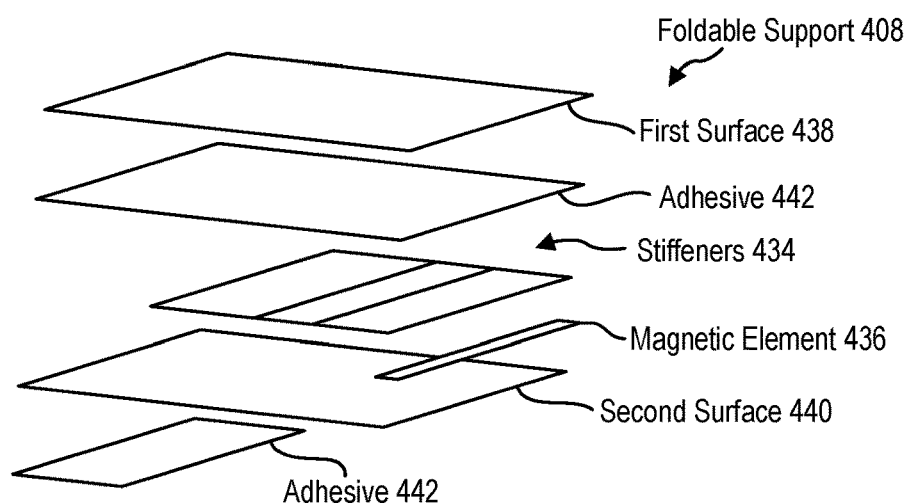
FIG. 4 is an exploded view of a foldable support, according to at least one embodiment of the present disclosure.

In some embodiments, the foldable support includes a series of layers bonded, adhered, welded, or otherwise affixed to one another. FIG. 4 is an exploded view of an embodiment of a foldable support 408 according to the present disclosure. In some embodiments, the layers include flexible layers with stiffeners 434 affixed thereto to define the segments that are movable relative to one another. In some embodiments, the foldable support 408 includes a plurality of rigid panels with flexible or rotatable connections, such as hinges, therebetween.

In some embodiments, the foldable support 408 includes a magnetic element 436 positioned at a movable edge opposite from the anchor segment or anchor axis. The magnetic element 436 provides a magnetic attractive force between the movable edge and the body of the accessory device when in the flat configuration or the stand configuration to retain the foldable device in either configuration.

In some embodiments, the foldable support 408 includes different materials or different textures of the same material on a first surface 438 and an opposite second surface 440 such that a first friction produced by the first surface 438 and a second friction produced by the second surface 440 are different from one another. In some embodiments, a higher friction material or texture is positioned on a first surface 438 that is oriented toward the accessory device in the flat configuration and a lower friction material or texture is positioned on the second surface 440 and oriented away from the accessory device in the flat configuration. When in the flat configuration, the lower coefficient of friction (COF) of the second surface 440 allows the accessory device to slide more easily and without marring the surface upon which the accessory device rests. When the foldable support 408 is in the stand configuration, the first surface 438 is exposed and oriented outward away from the accessory device to provide increased friction and resist movement for typing or other input commands on the accessory device. In some embodiments, the first surface 438 has a coefficient of friction of at least 0.3 on glass (such as cover glass used on an electronic device display). In some embodiments, the second surface 440 has a coefficient of friction of less than 0.2 on glass.

In some embodiments, the first surface 438 includes a polyurethane. In some embodiments, the first surface 438 includes Tetrapolyethelene, silicone, Santoprene, or other materials known in the art for providing non-slip surfaces on electronics.

In some embodiments, the second surface 440 includes a non-woven fabric, such as Alcantara. In some embodiments, the second surface 440 includes a woven fabric, aramid, hard coated glass, steel, aluminum, polycarbonates, Polyethylene terephthalate, polyoxymethylene, or other materials known in the art for providing non-stick or high wear resistance surfaces on electronics.

In some embodiments, the stiffeners 434 or other rigid elements in the foldable support 408 include a fiberglass reinforced epoxy, such as FR-4. In some embodiments, the stiffeners include steel, aluminum, polycarbonates, Polyethylene terephthalate, polyoxymethylene, etc.

In some embodiments, at least part of the foldable support 408 is radio frequency (RF) transparent to allow wireless communication and/or power transmission through the foldable support 408 to and/or from the accessory device. In some embodiments, all of the foldable support 408 is RF transparent to allow wireless communication and/or power transmission through the foldable support 408 to and/or from the accessory device. For example, the layers, stiffeners 434, and adhesives 442 are all RF transparent.

Figures 1, 5:
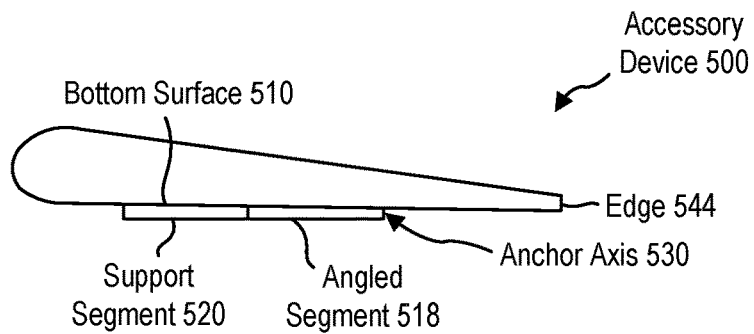
Figures 2, 5:
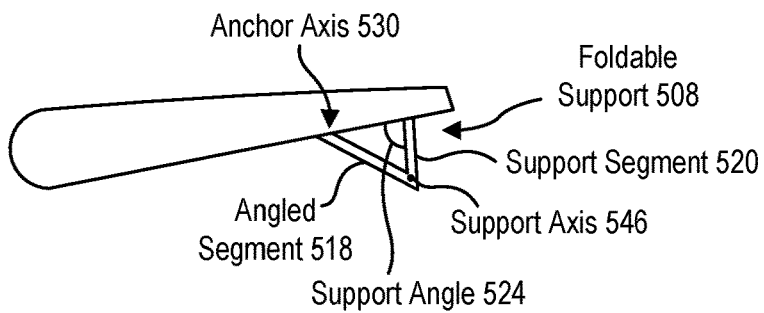

In some embodiments, the foldable support 408 includes at least the angled segment and the support segment. FIGS. 5-1 and 5-2 are side views of an embodiment of a foldable support 508 with only two segments. The angled segment 518 may be affixed to the bottom surface 510 of an accessory device 500 or other electronic device at an anchor axis 530. In some embodiments, the angled segment 518 is affixed at the anchor axis 530 on the bottom surface 510 and offset from the edge 544 of the accessory device 500 or other electronic device. In some embodiments, the anchor axis 530 is located on the bottom surface 510 and at least 5 millimeters (mm) from the edge 544 of the accessory device 500. In some embodiments, the anchor axis 530 is located on the bottom surface 510 and at least 10 mm from the edge 544 of the accessory device 500. In some embodiments, the anchor axis 530 is located on the bottom surface 510 and at least 15 mm from the edge 544 of the accessory device 500.

In some embodiments, the angled segment 518 rotates around the anchor axis 530, and, as shown in FIG. 5-2, the support segment 520 rotates relative to the angled segment 518 around the support axis 546 to position the foldable support 508 in the stand configuration. In some embodiments, the support angle 524 between the support segment and the bottom surface of the accessory device is in a range having an upper value, a lower value, or upper and lower values including any of 60°, 65°, 70°, 75°, 80°, 85°, 90°, or any values therebetween. In some embodiments, the support angle 524 is greater than 60°. In some embodiments, the support angle 524 is less than 90°. In some embodiments, the support angle 524 is between 60° and 90°. In at least one embodiment, the support angle 524 is between 70° and 85°. As the support angle 524 approaches 90°, the support segment 520 provides more compressive strength and stability to the foldable support 508 in the stand configuration. As the support angle 524 decreases, the foldable support 508 in the stand configuration provides greater longitudinal stability.

Figure 6:
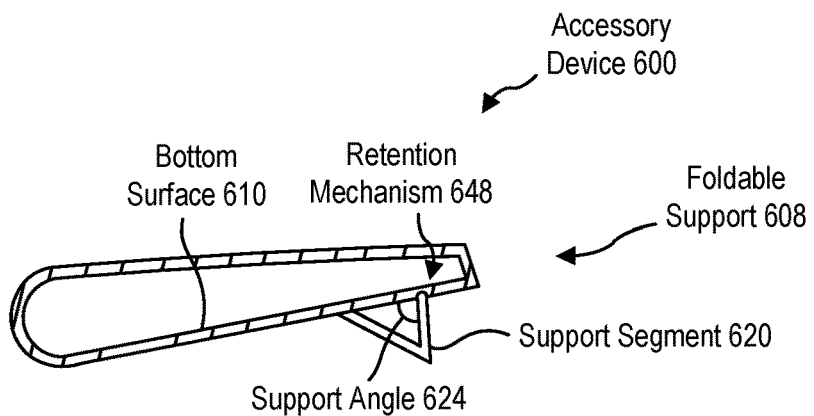
FIG. 6 is a side cross-sectional view of an accessory device with a foldable support engaged with a retention mechanism, according to at least one embodiment of the present disclosure.

Referring now to FIG. 6, when a foldable support 608 is in the stand configuration, in some embodiments, the foldable support 608 and/or the accessory device 600 include a retention mechanism 648 to retain the support segment 620 at the support angle 624 relative to the bottom surface 610. In some embodiments, the retention mechanism 648 includes a notch or other recess in the bottom surface that limits the movement of an edge of the support segment 620 relative to the bottom surface 610. In some embodiments, the support segment 620 snaps into a slot or receiver in the bottom surface 610. In some embodiments, the support segment is magnetically attracted to the bottom surface that limits the movement of an edge of the support segment 620 relative to the bottom surface 610. In some embodiments, the bottom surface has a ridge or other protrusion that limits the movement of an edge of the support segment 620 relative to the bottom surface 610.

INDUSTRIAL APPLICABILITY

The present disclosure relates generally to supporting an accessory device or electronic device at an ergonomic orientation. In some embodiments, a foldable support positioned on a bottom surface of the accessory device has a flat configuration and a stand configuration. When in the flat configuration, the foldable support is flat against a bottom surface of the accessory device and adds little height to the accessory device. When in the stand configuration, the foldable support supports a body of the accessory device at an angle relative to the surface upon which the accessory device rests. The foldable support may provide a more comfortable and familiar ergonomic position for a user to provide inputs to the accessory device.

In some embodiments, a system includes an accessory device and an electronic device. For example, a user may place the accessory device with an input device(s) oriented upward (e.g., toward the user) on a first surface of the electronic device in a docked position. In some embodiments, the input device is a conventional QWERTY keyboard or other alphanumeric keyboard, a number pad, a touch-sensitive surface (i.e., a capacitive or inductive touch-sensitive surface or display) such as trackpad, a scroll wheel, a trackball, a biometric reader, or other input device for providing information to the electronic device. The docked position may allow a user to easily transport and store the accessory device in the electronic device. When open in a laptop posture, the electronic device may support the accessory device on the first surface.

In some embodiments, a user provides input commands to the accessory device (and to the electronic device via the accessory device) on the input device. In some embodiments, the accessory device and the electronic device utilize near field communication (NFC) protocol to charge and/or communicate via the coils in the accessory device and the electronic device. In some embodiments, the accessory device and the electronic device utilize Qi protocol or other magnetic communication protocols to charge and/or communicate via the coils and. In some embodiments, the accessory device and the electronic device communicate through other radio frequency communications, such as Bluetooth or WiFi-direct communication protocols.

In some embodiments, the accessory device blocks, obscures, or otherwise inhibits the use of a portion of the electronic device when the accessory device is in the docked position. In some embodiments, the accessory device is usable in an undocked position remote of the first surface of the electronic device. The user can place the accessory device in the undocked position to continue using the accessory device wirelessly to the electronic device without occupying the first surface.

In some embodiments, the accessory device has a fabric covering, e.g., is wrapped in fabric. In some embodiments, the fabric covering includes a foldable support component on the bottom of the accessory device.

In some embodiments, the foldable support is affixed to a bottom surface of the accessory device. The bottom surface is opposite a top surface that includes one or more input devices. The foldable support is fixed to the bottom surface along an anchor segment of the foldable support. In some embodiments, the foldable support has at least two segments connected to the anchor segment that are foldable along hinges and movable relative to the anchor segment. In a flat configuration, all of the segments of the foldable support are positioned against the bottom surface of the accessory device.

In some embodiments, the additional segments include at least an angled segment and a support segment. In some embodiments, the foldable support further includes a contact segment. The segments are movable relative to one another by flexible connections positioned between the segments. In some embodiments, the foldable support includes hinges positioned between the segments. In some embodiments, the foldable support includes flexible material connecting the segments to allow rotation of the segments relative to one another.

In some embodiments, the flexible connections provide little or no rotational resistance and allow the segments to rotate freely between the stand configuration and the flat configuration. In some embodiments, the flexible connections provide less than 100 Newton-millimeters (N-mm) of rotational resistance each. In some embodiments, the flexible connections provide less than 200 Newton-millimeters (N-mm) of rotational resistance each. In some embodiments, it is critical that the flexible connections provide less than 400 Newton-millimeters (N-mm) of rotational resistance each.

By folding the additional segments to wrap around toward the anchor segment, the foldable support is movable to a stand configuration. In some embodiments, the stand configuration includes the support segment of the foldable support oriented at an angle to the bottom surface of the accessory device. In some embodiments, the foldable support in the stand configuration orients the bottom surface of the accessory device at a stand angle relative to a flat surface upon which the accessory device rests in a range having an upper value, a lower value, or upper and lower values including any of 2°, 4°, 6°, 8°, 10°, 12°, 14°, 15°, or any values therebetween. In some embodiments, the stand angle is greater than 2°. In some embodiments, the stand angle is less than 15°. In some embodiments, the stand angle is between 2° and 15°.

In some embodiments, the stand configuration includes folding the foldable support around at least an anchor axis, such that the angled segment 218 moves around the anchor axis. In some embodiments, the contact segment is positioned parallel to and contacting the anchor segment of the foldable support. The support segment is oriented at a support angle to the bottom surface and/or the anchor segment to provide support to the accessory device. In some embodiments, the support angle is in a range having an upper value, a lower value, or upper and lower values including any of 60°, 65°, 70°, 75°, 80°, 85°, 90°, or any values therebetween. In some embodiments, the support angle is greater than 60°. In some embodiments, the support angle is less than 90°. In some embodiments, the support angle is between 60° and 90°. In at least one embodiment, the support angle is between 70° and 85°. As the support angle approaches 90°, the support segment provides more compressive strength and stability to the foldable support in the stand configuration. As the support angle decreases, the foldable support in the stand configuration provides greater longitudinal stability.

In some embodiments, the accessory device and/or the foldable support includes a stand sensor configured to detect when the foldable support is in the stand configuration. In some embodiments, the stand sensor is a Hall Effect sensor that measures the presence of a magnet located in the contact segment and/or the support segment in proximity to the stand sensor. When the foldable support is in the stand configuration, a magnetic element positioned in or on the contact segment or support segment may be located proximate the stand sensor.

In some embodiments, the stand sensor is a force sensor positioned to measure a force applied by the support segment. The force measured by the stand sensor when the foldable support is in the flat configuration will be less than when the foldable support is in the stand configuration. The increase in measured force may indicate the foldable support is in the stand configuration.

In some embodiments, the stand sensor is a contact switch located in a recess of the anchor segment. When the foldable support is in the stand configuration, a complementary protrusion in the contact segment and/or the support segment contacts the stand sensor and indicates the foldable support is in the stand configuration.

In some embodiments, the foldable support has four segments. The anchor segment is configured to be affixed to the bottom surface of an accessory device or other electronic device, while the remaining three segments are movable relative to the anchor segment. In some embodiments, the contact segment is shorter than the angled segment. In some embodiments, the support segment is shorter than the angled segment. In some embodiments, both the support segment and the contact segment are shorter than the angled segment. In some embodiments, the support segment is shorter than both the angled segment and the contact segment. In some embodiments, the support segment is shorter than the contact segment, which is, in turn, shorter than the angled segment.

In some embodiments, the foldable support includes a series of layers bonded, adhered, welded, or otherwise affixed to one another. In some embodiments, the layers include flexible layers with stiffeners affixed thereto to define the segments that are movable relative to one another. In some embodiments, the foldable support includes a plurality of rigid panels with flexible or rotatable connections, such as hinges, therebetween.

In some embodiments, the foldable support includes a magnetic element positioned at a movable edge opposite from the anchor segment or anchor axis. The magnetic element provides a magnetic attractive force between the movable edge and the body of the accessory device when in the flat configuration or the stand configuration to retain the foldable device in either configuration.

In some embodiments, the foldable support includes different materials or different textures of the same material on a first surface and an opposite second surface such that a first friction produced by the first surface and a second friction produced by the second surface are different from one another. In some embodiments, a higher friction material or texture is positioned on a first surface that is oriented toward the accessory device in the flat configuration and a lower friction material or texture is positioned on the second surface and oriented away from the accessory device in the flat configuration. When in the flat configuration, the lower coefficient of friction (COF) of the second surface allows the accessory device to slide more easily and without marring the surface upon which the accessory device rests. When the foldable support is in the stand configuration, the first surface is exposed and oriented outward away from the accessory device to provide increased friction and resist movement for typing or other input commands on the accessory device. In some embodiments, the first surface has a coefficient of friction of at least 0.3 on glass (such as cover glass used on an electronic device display). In some embodiments, the second surface has a coefficient of friction of less than 0.2 on glass.

In some embodiments, the first surface 438 includes a polyurethane. In some embodiments, the first surface 438 includes Tetrapolyethelene, silicone, Santoprene, or other materials known in the art for providing non-slip surfaces on electronics.

In some embodiments, the second surface 440 includes a non-woven fabric, such as Alcantara. In some embodiments, the second surface 440 includes a woven fabric, aramid, hard coated glass, steel, aluminum, polycarbonates, Polyethylene terephthalate, polyoxymethylene, or other materials known in the art for providing non-stick or high wear resistance surfaces on electronics.

In some embodiments, the stiffeners or other rigid elements in the foldable support include a fiberglass reinforced epoxy, such as FR-4. In some embodiments, the stiffeners include steel, aluminum, polycarbonates, Polyethylene terephthalate, polyoxymethylene, etc.

In some embodiments, at least part of the foldable support is radio frequency (RF) transparent to allow wireless communication and/or power transmission through the foldable support to and/or from the accessory device. In some embodiments, all of the foldable support is radio frequency (RF) transparent to allow wireless communication and/or power transmission through the foldable support to and/or from the accessory device.

In some embodiments, the foldable support includes at least the angled segment and the support segment. The angled segment may be affixed to the bottom surface of an accessory device or other electronic device at an anchor axis. In some embodiments, the angled segment is affixed at the anchor axis on the bottom surface and offset from the edge of the accessory device or other electronic device. In some embodiments, the anchor axis is located on the bottom surface and at least 5 millimeters (mm) from the edge of the accessory device. In some embodiments, the anchor axis is located on the bottom surface and at least 10 millimeters (mm) from the edge of the accessory device. In some embodiments, the anchor axis is located on the bottom surface and at least 15 millimeters (mm) from the edge of the accessory device.

In some embodiments, the angled segment rotates around the anchor axis, and the support segment rotates relative to the angled segment around the support axis to position the foldable support in the stand configuration. In some embodiments, the support angle between the support segment and the bottom surface of the accessory device is in a range having an upper value, a lower value, or upper and lower values including any of 60°, 65°, 70°, 75°, 80°, 85°, 90°, or any values therebetween. In some embodiments, the support angle is greater than 60°. In some embodiments, the support angle is less than 90°. In some embodiments, the support angle is between 60° and 90°. In at least one embodiment, the support angle is between 70° and 85°. As the support angle approaches 90°, the support segment provides more compressive strength and stability to the foldable support in the stand configuration. As the support angle decreases, the foldable support in the stand configuration provides greater longitudinal stability.

When the foldable device is in the stand configuration, in some embodiments, the foldable support and/or the accessory device include a retention mechanism to retain the support segment at the support angle relative to the bottom surface. In some embodiments, the retention mechanism includes a notch or other recess in the bottom surface that limits the movement of an edge of the support segment relative to the bottom surface. In some embodiments, the support segment snaps into a slot or receiver in the bottom surface. In some embodiments, the support segment is magnetically attracted to the bottom surface that limits the movement of an edge of the support segment relative to the bottom surface. In some embodiments, the bottom surface has a ridge or other protrusion that limits the movement of an edge of the support segment relative to the bottom surface.

The present disclosure relates to systems and methods for supporting an accessory device according to at least the examples provided in the sections below:

1. A support device comprising:
    an angled segment (e.g., angled segment 218, 318, 518, 618) configured to be affixed to a bottom surface (e.g., bottom surface 210, 510, 610) of a second device (e.g., accessory device 100, 200, 500, 600) and rotatable relative to the bottom surface at an anchor axis (e.g., anchor axis 230, 530); and
    a support segment (e.g., support segment 220, 320, 520, 620) connected to the angled segment along a support axis (e.g., support axis 546) and rotatable relative to the angled segment around the support axis.
2. The support device of section 1, further comprising an anchor segment (e.g., anchor segment 216, 316) connected to the angled segment and configured to rotate relative to the angled segment around the anchor axis.
3. The support device of sections 1 or 2, further comprising a first surface (e.g., first surface 438) of the angled segment and support segment and a second surface (e.g., second surface 440) opposite the first surface, wherein the first surface and second surface have different coefficients of friction.
4. The support device of section 3, wherein the first surface has a coefficient of friction greater than 0.3 on glass.
5. The support device of sections 3 or 4, wherein the second surface has a coefficient of friction less than 0.2 on glass.
6. The support device of any preceding section, further comprising a contact segment (e.g., contact segment 222, 322) connected to the support segment opposite the angled segment and configured to rotate relative to the support segment.
7. An input device for an electronic device, the input device comprising:
    a body (e.g., body 212);
    an input mechanism (e.g., input mechanism 104) positioned on a first side (e.g., top surface 214) of the body; and
    a foldable support (e.g., foldable support 208, 308, 408, 508, 608) positioned on a second side (e.g., bottom surface 210) of the body opposite the first side, wherein the foldable support is affixed to the second side of the body and an anchor axis (e.g., anchor axis 230, 530) is offset from an edge (e.g., edge 544) of the body and the foldable support has a first surface (e.g., first surface 438) and an opposite second surface (e.g., second surface 440).
8. The input device of section 7, wherein the foldable support comprises three segments (e.g., angled segment 218, 318, 518, 618; support segment 220, 320, 520, 620; anchor segment 216, 316; contact segment 222, 322) connected by flexible connections.
9. The input device of section 8, wherein the foldable support is affixed to the second side of the body at a first segment (e.g., anchor segment 216, 316).
10. The input device of sections 8 or 9, wherein the foldable support further comprises a magnetic element (e.g., magnetic element 436) in at least one of the segments and the magnetic element generates a magnetic attraction to the body.
11. The input device of any of sections 8-10, wherein the flexible connections provide less than 400 Newton-millimeters of rotational resistance.
12. The input device of any of sections 7-11, wherein the foldable support comprises four segments connected by flexible connections and is affixed on at least 50% of a surface area of the first surface of a first segment (e.g., anchor segment 216, 316) of the foldable support.
13. The input device of any of sections 7-12, wherein the first surface has a coefficient of friction greater than 0.3 on glass.
14. The input device of any of sections 7-13, wherein the second surface has a coefficient of friction less than 0.2 on glass.
15. The input device of any of sections 7-14, wherein the first surface comprises Alcantara.
16. The input device of any of sections 7-14, wherein the second surface comprises polyurethane.
17. An input device for an electronic device, the input device comprising:
    a body (e.g., body 212);
    an input mechanism (e.g., input mechanism 104) positioned on a first side (e.g., top surface 214) of the body; and
    a foldable support (e.g., foldable support 208, 308, 408, 508, 608) positioned on a second side (e.g., bottom surface 210) of the body opposite the first body and having a flat configuration and a stand configuration, wherein the flat configuration is parallel to the bottom surface of the body and the stand configuration projects away from the bottom surface of the body when rotated away from an anchor axis (e.g., anchor axis 230, 530) that is offset from an edge (e.g., edge 544) of the body.

18. The input device of section 17, wherein the foldable support comprises at least two movable segments (e.g., angled segment 218, 318, 518, 618; support segment 220, 320, 520, 620; anchor segment 216, 316; contact segment 222, 322) connected by flexible connections, an angled segment of the movable segments being longer than a support segment of the movable segments.

19. The input device of sections 17 or 18, wherein the bottom surface is oriented parallel to a surface upon which the input device rests when in the flat configuration and is oriented at a stand angle (e.g., stand angle 226) between 2° and 15° when the foldable support is in the stand configuration.

20. The input device of any of sections 17-19, wherein a support segment is oriented at a support angle (e.g., support angle 224) relative to the bottom surface between 60° and 90° in the stand configuration.

21. The input device of any of sections 17-20, wherein the accessory device has a fabric covering, and the fabric covering includes the foldable support component on the bottom of the accessory device.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A support device, comprising:
   an angled segment configured to be affixed to a bottom surface of a second device and rotatable relative to the bottom surface at an anchor axis;
   a support segment connected to the angled segment along a support axis and rotatable relative to the angled segment around the support axis; and
   an anchor segment connected to the angled segment and configured to rotate relative to the angled segment around the anchor axis.

2. The support device of claim 1, further comprising a first surface of the angled segment and the support segment and a second surface opposite the first surface, wherein the first surface and the second surface have different coefficients of friction.

3. The support device of claim 2, wherein the first surface has a coefficient of friction greater than 0.3 on glass.

4. The support device of claim 2, wherein the second surface has a coefficient of friction less than 0.2 on glass.

5. A support device, comprising:
   an angled segment configured to be affixed to a bottom surface of a second device and rotatable relative to the bottom surface at an anchor axis;
   a support segment connected to the angled segment along a support axis and rotatable relative to the angled segment around the support axis; and
   a contact segment connected to the support segment opposite the angled segment and configured to rotate relative to the support segment.

6. An input device for an electronic device, the input device comprising:
   a body;
   an input mechanism positioned on a first side of the body; and
   a foldable support positioned on a second side of the body opposite the first side, wherein the foldable support is affixed to the second side of the body and an anchor axis is offset from an edge of the body and the foldable support has a first surface and an opposite second surface, wherein the first side of the body and the second side of the body are non-parallel with each other.

7. The input device of claim 6, wherein the foldable support comprises three segments connected by flexible connections.

8. The input device of claim 7, wherein the foldable support is affixed to the second side of the body at a first segment.

9. The input device of claim 7, wherein the foldable support further comprises a magnetic element in at least one of the segments and the magnetic element generates a magnetic attraction to the body.

10. The input device of claim 7, wherein the flexible connections provide less than 400 Newton-millimeters of rotational resistance.

11. The input device of claim 6, wherein the foldable support comprises four segments connected by flexible connections and is affixed on at least 50% of a surface area of a first surface of a first segment of the foldable support.

12. The input device of claim 6, wherein the first surface has a coefficient of friction greater than 0.3 on glass.

13. The input device of claim 6, wherein the second surface has a coefficient of friction less than 0.2 on glass.

14. The input device of claim 6, wherein the first surface comprises Alcantara.

15. The input device of claim 6, wherein the second surface comprises polyurethane.

16. An input device for an electronic device, the input device comprising:
  a body;
  keyboard positioned on a top surface of the body; and
  a foldable support positioned on a bottom surface of the body opposite the top surface, wherein the foldable support is affixed to the bottom surface of the body and has a flat configuration and a stand configuration, wherein the flat configuration is parallel to the bottom surface of the body and the stand configuration projects away from the bottom surface of the body when rotated away from an anchor axis that is offset from an edge of the body.

17. The input device of claim 16, wherein the foldable support comprises at least two movable segments connected by flexible connections, an angled segment of the movable segments being longer than a support segment of the movable segments.

18. The input device of claim 16, wherein the bottom surface is oriented parallel to a surface upon which the input device rests when in the flat configuration and is oriented at a stand angle between 2° and 15° when the foldable support is in the stand configuration.

19. The input device of claim 16, wherein a support segment is oriented at a support angle relative to the bottom surface between 60° and 90° in the stand configuration.

20. The input device of claim 16, wherein the accessory device has a fabric covering, and the fabric covering includes the foldable support component on the bottom of the accessory device.

* * * * *

UNITED STATES PATENT AND TRADEMARK OFFICE
CERTIFICATE OF CORRECTION

PATENT NO. : 11,169,576 B2
APPLICATION NO. : 16/866270
DATED : November 9, 2021
INVENTOR(S) : Kent Allen Campbell et al.

It is certified that error appears in the above-identified patent and that said Letters Patent is hereby corrected as shown below:

In the Specification

Column 6
Line 22 change "non-woven fabric, such as Alcantara." to --non-woven fabric, such as ALCANTARA®.--

Column 10
Line 39 change "non-woven fabric, such as Alcantara." to --non-woven fabric, such as ALCANTARA®.--

Column 12
Line 52 change "first surface comprises Alcantara." to --first surface comprises ALCANTARA®.--

Signed and Sealed this
Seventh Day of June, 2022

Katherine Kelly Vidal
*Director of the United States Patent and Trademark Office*